United States Patent [19]

Karpinsky et al.

[11] 4,267,561
[45] May 12, 1981

[54] COLOR VIDEO DISPLAY FOR AUDIO SIGNALS

[76] Inventors: John R. Karpinsky, 1280 Boynton, #5, Glendale, Calif. 91205; Thomas G. Moore, 931 Alta Pine Dr., Altadena, Calif. 91001

[21] Appl. No.: 847,708

[22] Filed: Nov. 2, 1977

[51] Int. Cl.³ .............................................. H04N 9/02
[52] U.S. Cl. ....................................................... 358/82
[58] Field of Search ................. 358/81, 82; 179/1 SP, 179/1 G, 1 GQ, 1 MN; 273/DIG. 28; 84/464

[56] References Cited

U.S. PATENT DOCUMENTS

| | | | |
|---|---|---|---|
| 3,581,192 | 5/1971 | Miura | 324/77 E |
| 3,604,852 | 9/1971 | Weintraub | 358/82 |
| 3,627,912 | 12/1971 | Hearn | 358/82 |
| 3,723,652 | 3/1973 | Alles et al. | 358/82 |
| 3,940,789 | 2/1976 | Kratz et al. | 358/82 |
| 4,167,752 | 9/1979 | Liebler et al. | 358/82 |

*Primary Examiner*—John C. Martin
*Attorney, Agent, or Firm*—John E. Wagner

[57] ABSTRACT

Apparatus for producing a video display on a television receiver or equivalent from two channels of audio. The audio channels are fed through two banks of audio filters to separate the audio into descrete frequency bands. In the preferred embodiment, sixty-four filters per bank are used. Each set of frequency bands is mixed electrically to produce a third set of signals which are a function of the difference in phase or amplitude of the original two. These three sets of audio signals are then rectified to produce dc levels and are used sequentially, as red, green and blue inputs to produce a color display. The sequence is determined by a digital apparatus which provides that, in the basic configuration the horizontal position of each dot on the raster corresponds to a particular frequency, the color and intensity of each dot being a function of input audio amplitude and the relative phase or amplitude of the input audio channels. The vertical position of a display is a function of time so that linear bars of color are produced in response to the audio input. Additional digital circuits are provided to transform the basic display into numerous positional variations including repetitive images and mirror images in the vertical and horizontal planes, diagonal displays and circular displays.

17 Claims, 7 Drawing Figures

COLOR VIDEO DISPLAY FOR AUDIO SIGNALS

BACKGROUND OF THE INVENTION

The described apparatus is used to generate a visual color display from a stereo input and more specifically, generates a standard color television NTSC composite video signal for producing said display.

Numerous attempts have been made to produce displays in color or in black and white, from audio in either monoaural or stereo form. Some, like the apparatus for the Visual Aesthetic Display of Sound, by Weintraub, U.S. Pat. No. 3,604,852, couple the low, medium and high frequencies of monoaural sound to the three color beams, resulting in a display where color is a function of audio frequency. The lumping of all frequencies into low, medium and high bands severely reduces the amount of data available at the display so that the resultant display is not a reasonable analog of the original sound.

The Frequency Spectrum Analyzer With Displayable Colored Shiftable Frequency Spectrogram, by Miura, U.S. Pat. No. 3,581,192, uses a large number of audio filters and thus preserves a greater amount of real time data. The filter outputs are digitized, stored, multiplexed and applied to a color displaying device. On the resultant display, each display location is a function of time and frequency, and the color of each display point is a function of the intensity of the corresponding frequency. The resultant display is of use as a laboratory instrument, but does not necessarily produce a pleasing display, and has no provision for a stereo input.

There is a need, in the entertainment field for apparatus to display stereo in color where the display uses a significant amount of the data received from the audio lines, where the display is pleasing in appearance, where the operator has the option of choosing from a variety of displays, and where the apparatus can be produced at a reasonable cost.

SUMMARY OF THE INVENTION

The described embodiment receives the two stereo channels, and filters them through banks of individual filters to separate the audio into a plurality of narrow band outputs. There are nominally 64 filters in each channel but more or less could be used in a trade off between cost and display effectiveness. The filters could be implemented from any analog filter hardware including LC circuits, tuning forks or equivalent, or digital filters. In the described embodiment, operational amplifiers in combination with RC networks are used.

A third channel is then produced by mixing the original two sets of frequencies to produce a third set of audio signals. Each frequency is a function of the amplitude or phase difference of the original two. Each of these three sets of audio signals is then rectified to produce a dc level. Therefore, at all times, three sets of filter outputs are available, each set comprising sixty-four (for example) outputs corresponding in dc level to the intensity or phase between channels being received at that frequency. These filter outputs are converted into a display by associating each display point with three corresponding filter outputs where the location of the point is a function of the filter number (0–63), and therefore the frequency of the audio; and where the intensity and color of the display point is determined by the sum of the colors produced as a function of the three dc filter output signals.

If the display raster, in its progression from left to right, were simply to sequence through the filter outputs, the display produced would have linear bars at positions corresponding to frequencies, the color and intensity of the bars being functions of the corresponding filtered signal amplitudes. To generate a more pleasing and more effective display, various patterns may be generated by the apparatus to vary the display format.

One variation is to skew the display so that the output of each set of filters is displayed at a set of points where the filter number at which the display begins is a function of vertical position. Thus a vertical color bar in the basic mode becomes a slanted color bar in the skewed mode.

Mirrored images can also be generated so that the display is symmetrical about either a vertical or horizontal axis. The size of the display is also variable so that a number of identical images may be shown on the display surface. Finally, any of these patterns may be made non-linear to produce circular appearing patterns. In these ways, the operator may modify the display to expand portions of interest or modify the display to suit his personal taste.

This apparatus is designed to receive standard stereo equipment outputs and to produce standard color television NTSC composite video signals which are acceptable without modification by wall size TV displays of the type manufactured by Advent Corporation, or by standard video recorders, Sony Corporation's Betamax being an example of a commercially available unit. With the addition of an rf amplifier, this output could also be coupled directly into a standard color television receiver.

Therefore, this apparatus provides for converting a stereo output into a color television-type display where neither the stereo nor display equipment need be modified to produce the display; where display location is a function of frequency; where display point intensity and color are functions of the intensities and comparative amplitude or phase of the corresponding input channel narrow band frequencies; where a variety of patterns can be produced from the input audio; and which can be manufactured at a reasonable cost.

DETAILED DESCRIPTION OF THE INVENTION

Figure 1:
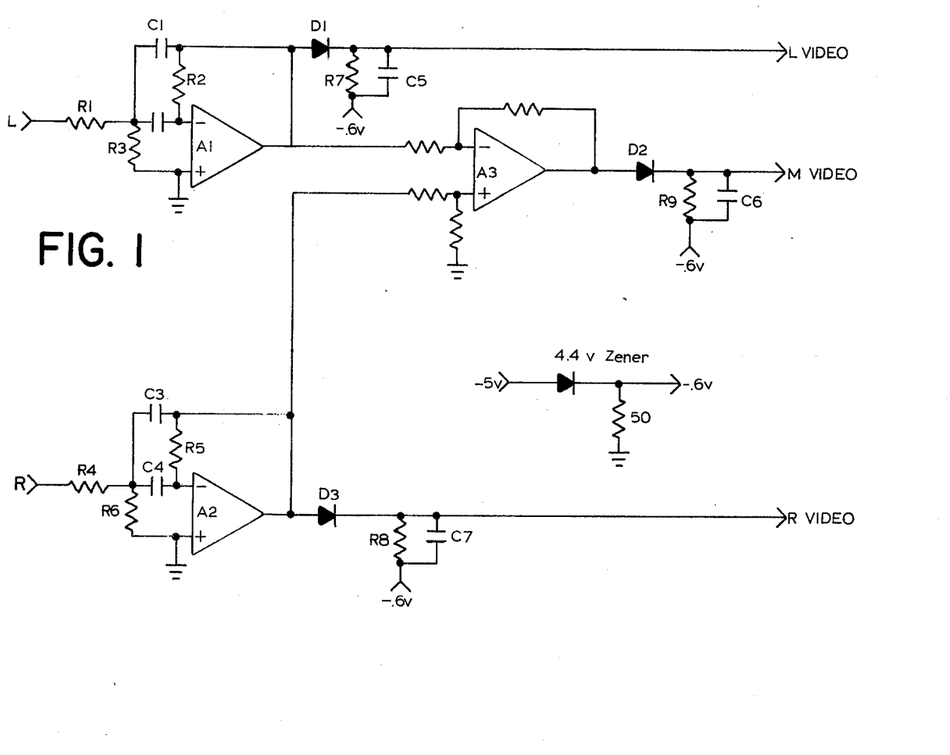
FIG. 1 is a schematic of the filter, mixer and rectifier constituting one audio filter channel.

In general the operation of the apparatus separates the audio channels into narrow frequency bands and converts each band amplitude into a dc level for use as a video color signal. FIG. 1 is a schematic of one set of filters to accomplish this function, sixty-four such sets being provided in the described embodiment. The two stereo inputs are applied to all sixty-four filter inputs in parallel. Components C1 through C4, R1 through R6 and operational amplifiers A1 and A2 are selected to pass a particular band of frequencies, and to block all others. The sinusoidal output of these two amplifiers are subtracted at operational amplifier A3 to form a third output. Finally, all three outputs are rectified, using components D1 through D3, R7 through R9 and C5 through C7, to produce a dc level corresponding in voltage to the amplitude of the selected frequency or to the difference of instantaneous amplitude, or phase, at the selected frequency between left and right channels. A −0.6 v bias signal is applied to the rectifying circuit to compensate for the diode voltage drop.

Figure 2:
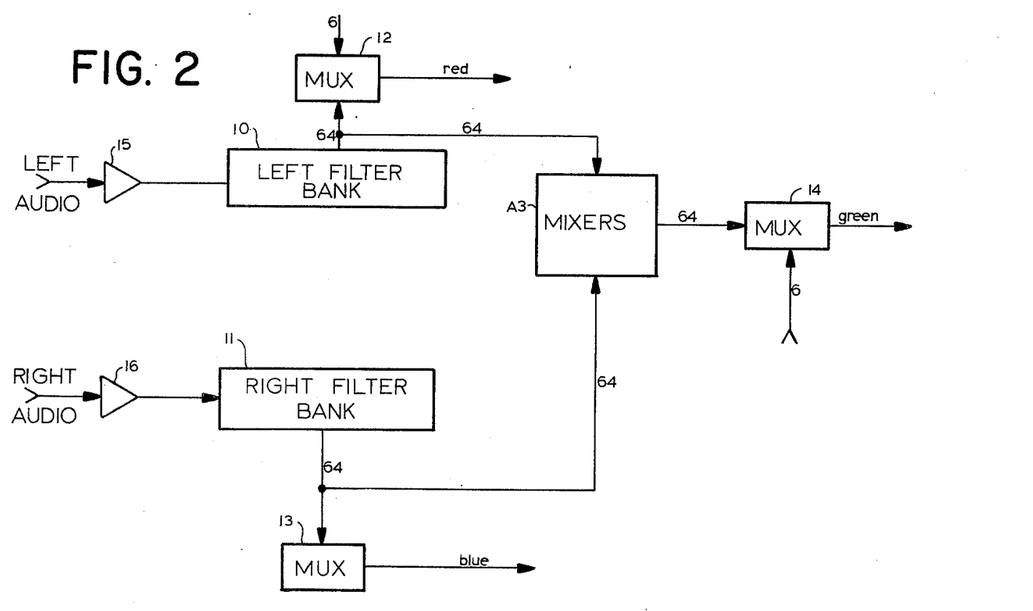
FIG. 2 is a block diagram of the channel multiplexing circuits.

The block diagram of FIG. 2 shows the audio multiplexing in more detail. A single line is supplied from the left and right stereo channels to the left and right filter banks 10 and 11, each comprising a set of sixty-four filters. These two sets of outputs are applied to sixty-four mixers, A3, to generate a third set of sixty-four audio signals. The filter banks 10 and 11 and the mixers A3 also rectify the signals to produce a dc level. Finally, these dc levels are multiplexed in multiplexers 12 through 14 to produce, at any instant, one green, one blue and one red signal which will be used to produce the display.

In the described embodiment, it is assumed that three corresponding outputs from the filters and mixer are selected simultaneously as a set. However, this is not a requirement as any mode of selection of multiplexer outputs can be implemented using this system.

Figure 3:
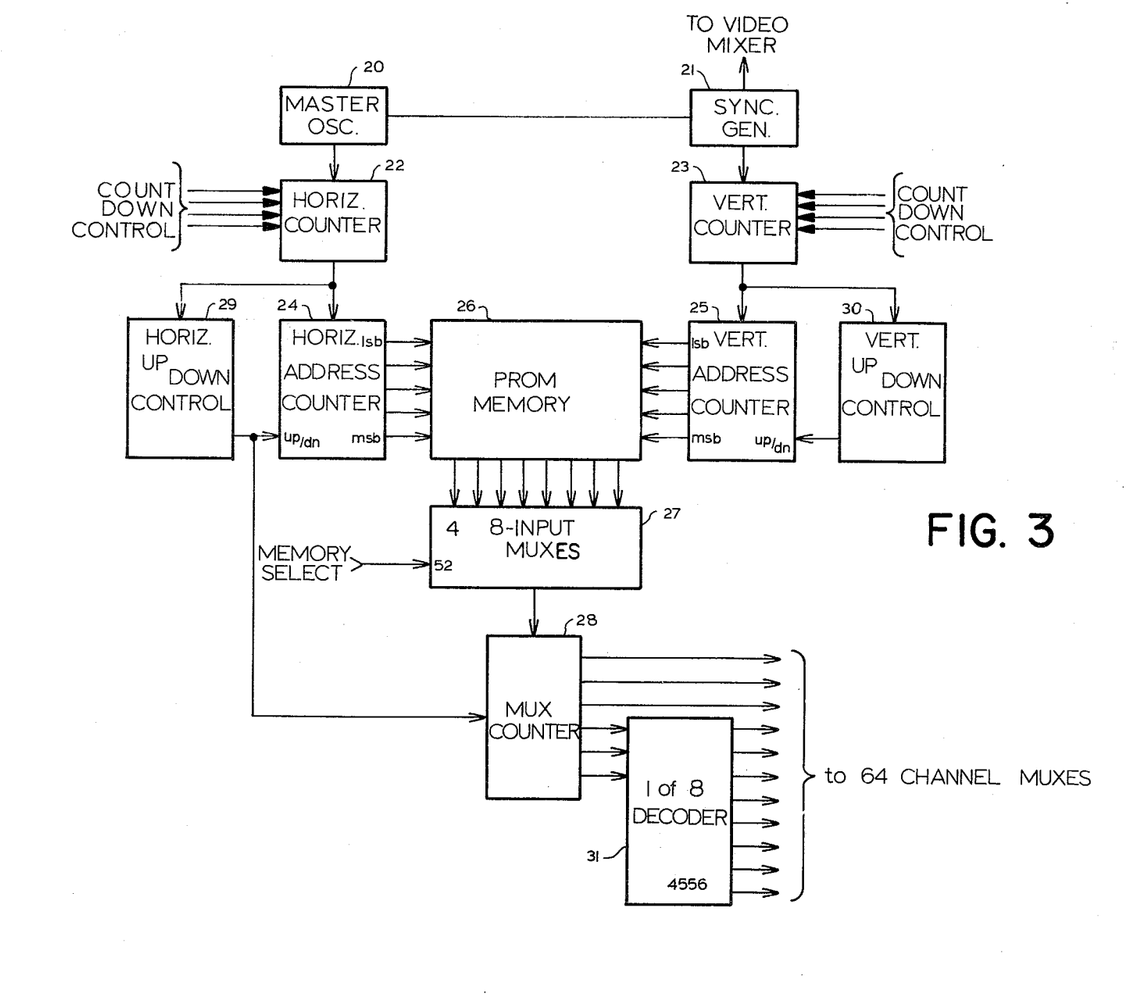
FIG. 3 is a block diagram of the logic circuits.

The mode of selecting filter outputs is implemented using the circuits shown and described in FIG. 3, a block diagram of the timing and control circuits.

The basic clock pulses are generated in the master oscillator 20 and sync generator 21, and are applied to a horizontal counter 22 and a vertical counter 23. The master oscillator 20 frequency may be variable. Also, the two counters can be reconfigured through the count down control lines to count up to various totals. Thus, the counter outputs are variable in frequency.

These variable counts drive the horizontal address counter 24 and the vertical address counter 25, each of which are 5 bit counters. The total 10 bits fully address the 1K×8 bit PROM memory 26, the eight bit output of which is applied to a multiplexer 27 which selects one output bit. Because the output of the PROM may be a 1 or a 0, each change of address may or may not result in a multiplexer 27 output.

This multiplexed PROM output is applied to a 64 bit counter which selects one of the 64 audio channels.

The operation of this circuit results in a TV type color display as follows. As the raster proceeds from left to right, and if all PROM bits result in an output pulse, then the display would cycle through the 64 sets of display points as the raster traverses the display. By varying the oscillator frequency, or by changing the horizontal counter total, each display point may be made wider or narrower, resulting in a display of a fraction of the filter outputs, to several full cycles of said filter outputs for each raster. The vertical dimension of each display point is similarly controlled by the vertical counter 23.

Rather than having the vertical and horizontal counters, 24 and 25, return to zero from a full count, the horizontal up/down control circuit 29, and vertical up/down control circuit 30 are provided to force the counter to count back to zero after reaching a full count. The visual effect at the display is that of producing a mirror image about either a vertical or horizontal axis.

The fact that there may be or may not be a PROM output for each change of vertical or horizontal address counter input means that the display can be made to be nonlinear. One result of this is those audio areas of interest can be expanded and those of less interest compacted. Also, the operator has an additional parameter under his control for producing a more pleasing display.

To summarize, the unmodified use of vertical and horizontal counters would result in straight line displays. The use of the PROM memory creates nonlinearities in either dimension.

The output of the apparatus of FIG. 3 is on a set of multiplexer lines to control multiplexers 12, 13 and 14 of FIG. 2, resulting in a red, green and blue output from the selected filters. These color signals are supplied to the encoder of FIG. 4 for further processing into a form usable by a television set.

Figure 4A:
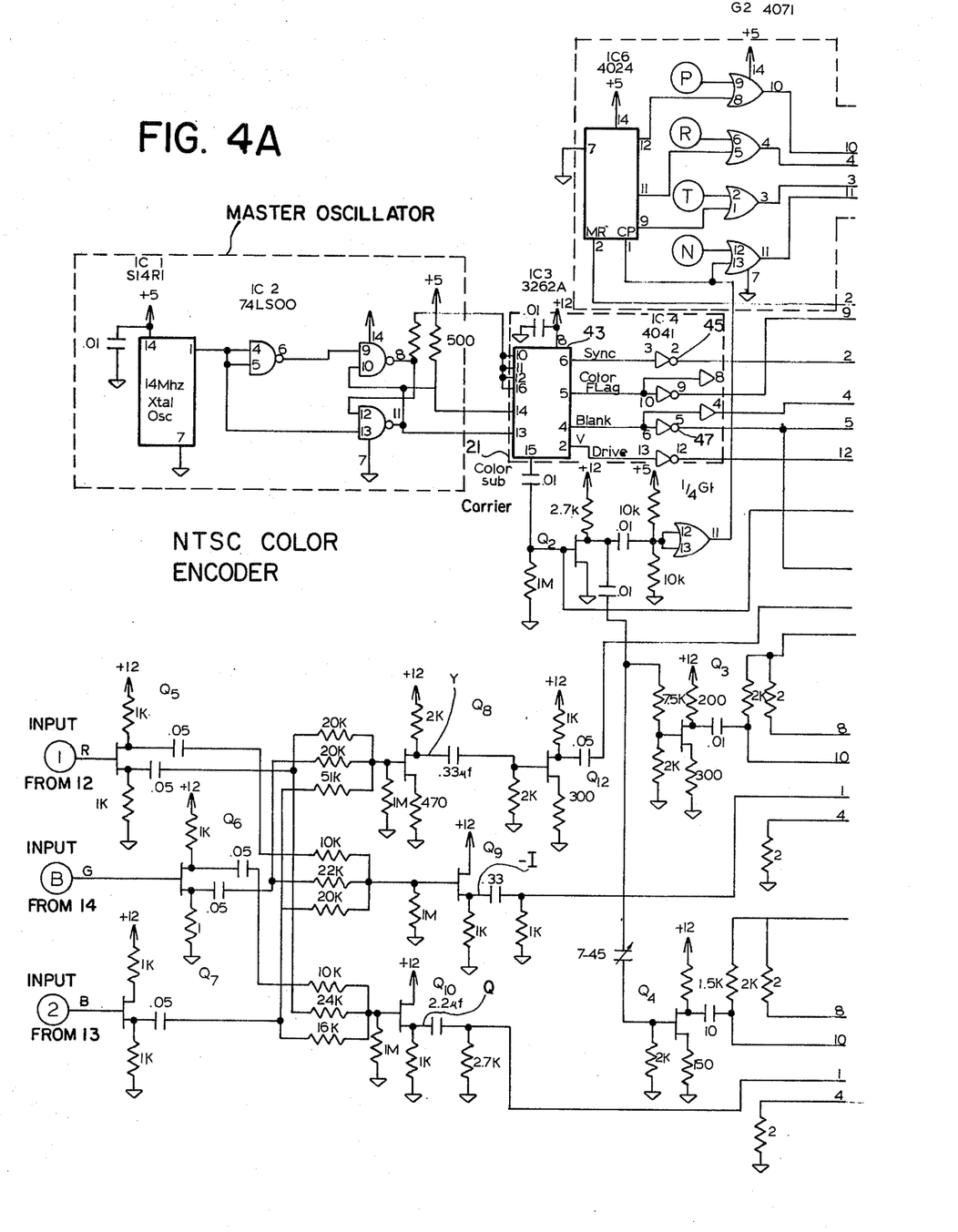
FIGS. 4A and 4B together are a schematic of the encoder.
Figure 4B:
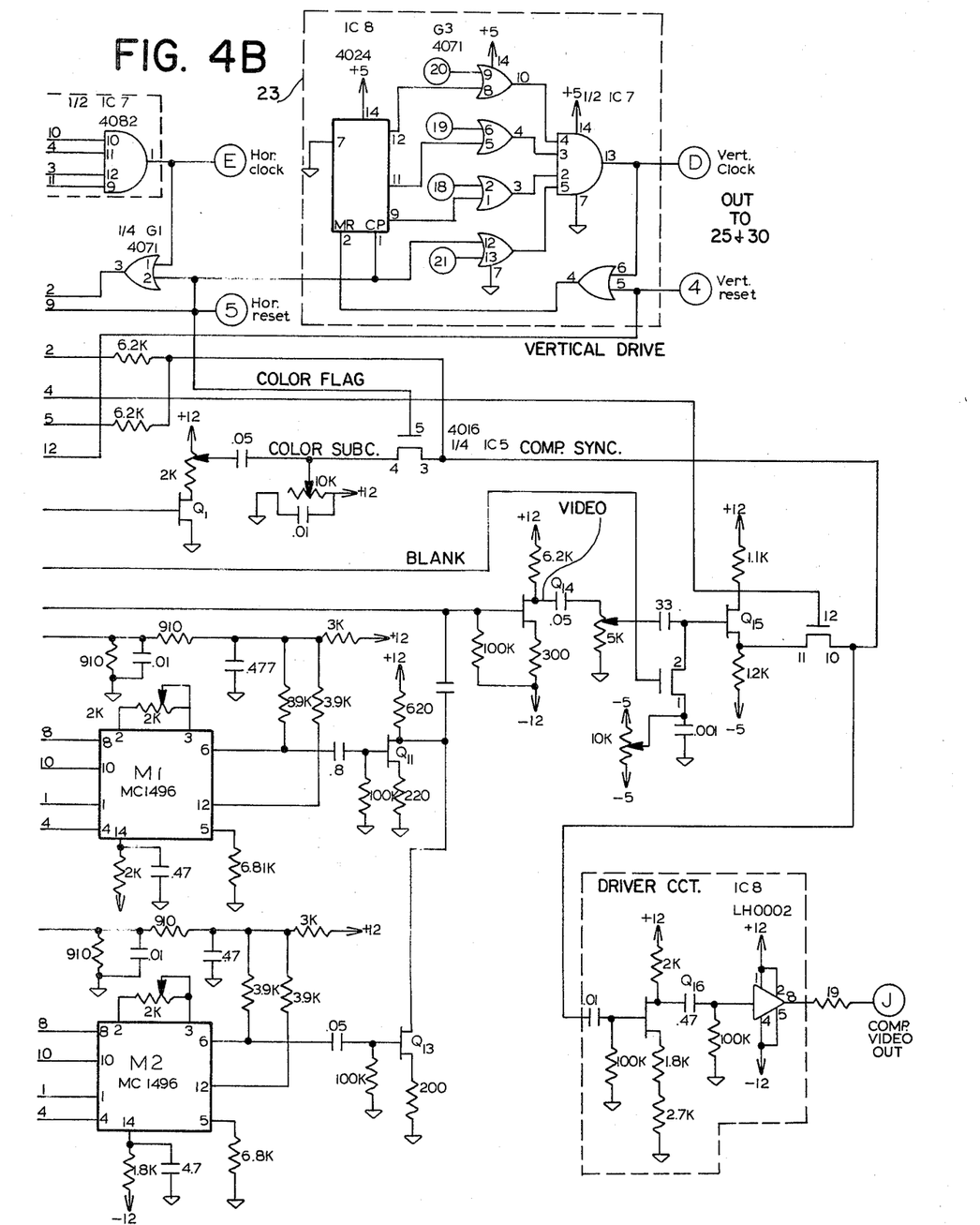

The inputs are applied to FET'S Q5, Q6 and Q7 for isolation and amplification and are then mixed at the inputs of Q8, Q9 and Q10 to produce standard television Y, I and Q signals. The I and Q signals are applied to standard color modulators 40, 41. In this case Motorola part No. MC1496 is used and outputs of modulators 40 and 41 are buffered in Q11 and Q13, finally to be applied through capacitor 42, along with the Y output of Q12 to the input of Q14. The output of Q14 then becomes a video signal and, as described below, will be used in the production of a standard NTSC composite video signal.

Simultaneously with the above, the master oscillator IC1 is generating clock pulses which are gated into a standard sync generator 43, in this case a Fairchild 3262A part, which produces a composite sync pulse, a blanking pulse, a color subcarrier signal, a color flag pulse, and a vertical drive signal.

The color modulators 40 and 41 modulate the I and Q signals with the subcarrier produced by the sync generator 43. This subcarrier is applied to transistors Q2, Q3 and Q4 which generate subcarrier outputs ninety degrees out of phase. These are then supplied to modulators 40 and 41 so that the modulated I and Q signals are modulated 90° out of phase.

The standard NTSC composite video signal comprises video, a blanking pulse, a color subcarrier burst and a sync pulse, all properly timed. The summation of signals occurs at circuit point 44 where the addition of these signals takes place. The sync and blanking pulses are generated by the sync generator 43 and applied through buffers 45 and 47 to point 44 through resistors 50 and 51. The color subcarrier burst is produced by the sync generator 43 and is amplified by transistor Q1 before being coupled to point 44. Finally, the video is coupled through transistor Q14, transistor Q15 to point 44. The summation of all these signals produces a standard composite video signal which is buffered in a driver circuit comprising transistor Q16 and operational amplifier 52 before being output at output jack J.

The composite video output at output jack J can be used directly by a projection TV system such as the Video Beam 1000A, manufactured by Advent Corporation, or equivalent. It can also be used directly by the Betamax video recorder manufactured by Sony Corporation. To adapt this output for home use, any commercial television frequency rf generator is used to couple the composite video output to a standard television receiver.

Commercial encoders for the production of composite video transmissions are manufactured by Cohu Electronics, Inc. and Columbia Broadcasting Systems, Inc.

An encoder was designed for this particular application since the commercial units are designed for commercial television station use and are too expensive for use in this equipment. However, they are functionally equivalent to the unit described herein.

The remaining circuits of FIG. 4 are the horizontal counter 22 (IC6) and vertical counter 23 (IC8) which were located on the encoder board as a matter of packaging convenience. The vertical counter receives the color flag from the sync generator as an input and counts to a number determined by switch settings on the control panel which are connected to the associated feedback gates. Similarly, in this embodiment, the color subcarrier coupled through transistor Q2 is sent to drive the horizontal counter. As an alternative, the master clock oscillator 20 (IC1) IC1 output could have been used.

The control panel functionally is sixteen switches implemented from an American Micro System, Inc. Part No. S9263. No description will be included here since the part is fully described by specifications published by that corporation.

Figure 5A:
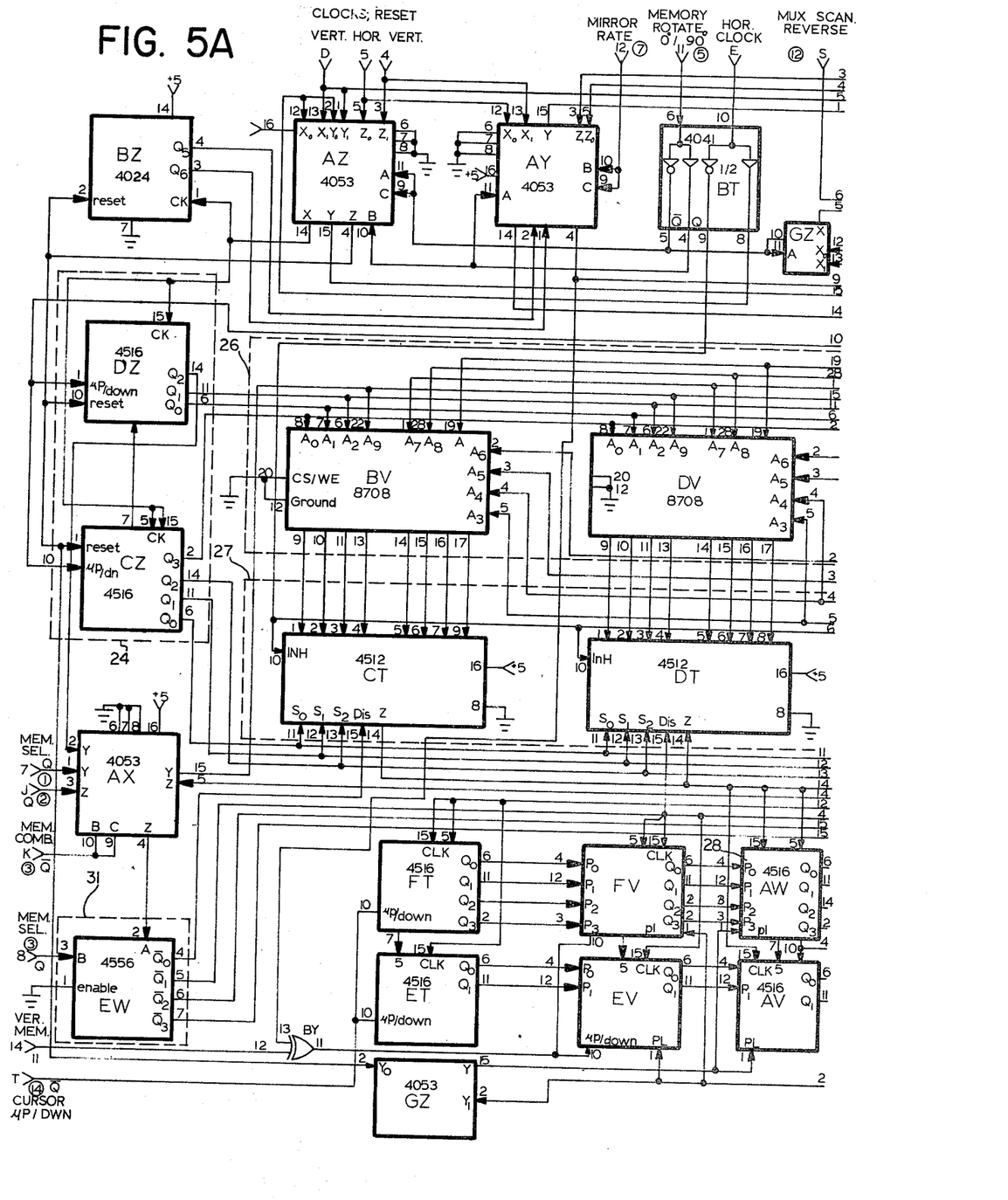
FIGS. 5A and 5B together are a schematic of the digital logic.
Figure 5B:
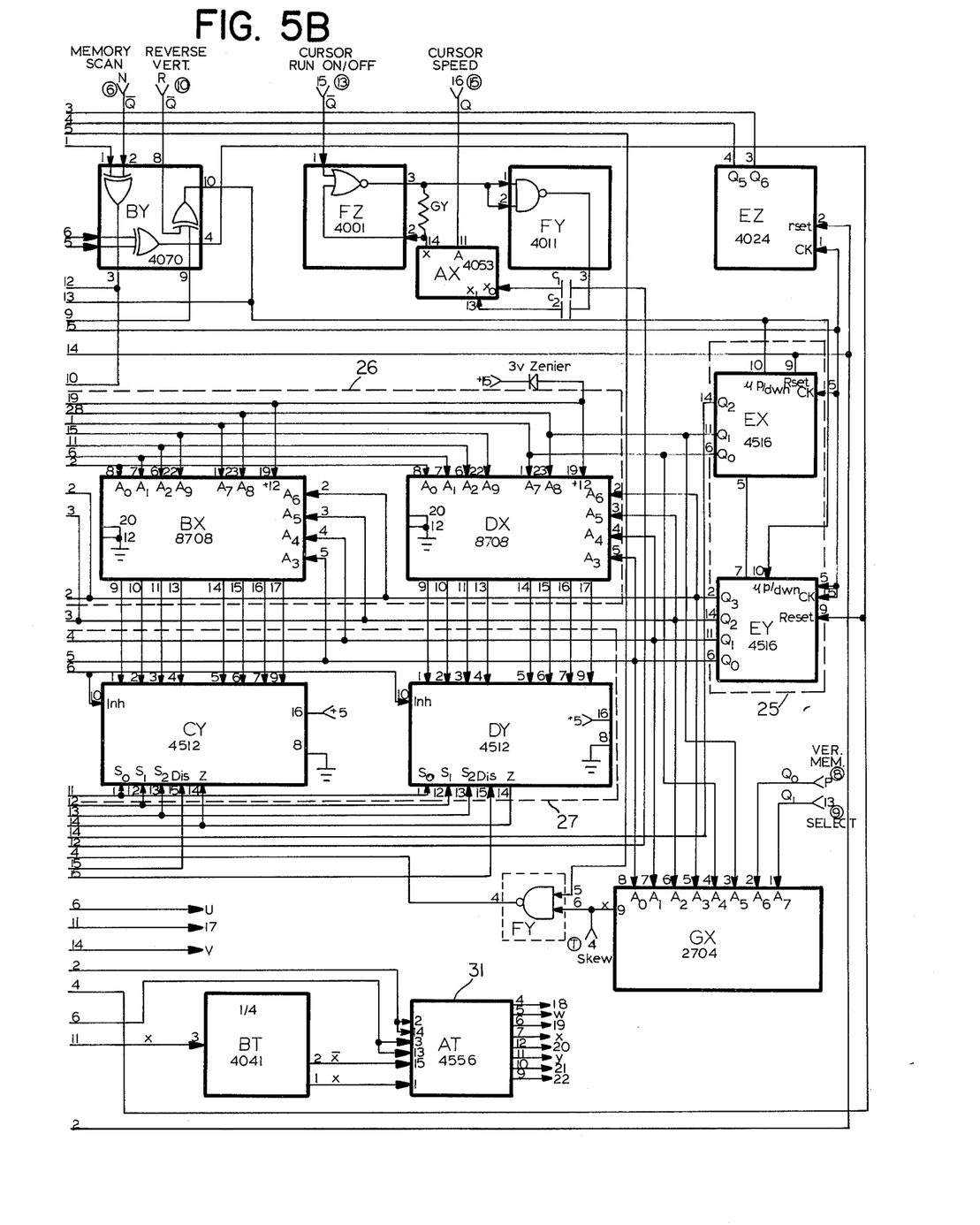

FIG. 5 is a detailed schematic of the remainder of the digital logic. PROM's 26 (BV, DV, BX and DX), each $1K \times 8$ bits provide the PROM storage capability shown as the Memory 26 of FIG. 3. Each PROM has eight output lines, one of which is selected by each of four multiplexers 27 (CT, DT, CY and DY). Simultaneously, the PROM's are addressed by vertical counter 25 (EX and EY) and horizontal counter 24 (DZ and CZ). The Z output lines of all multiplexers 27 are tied together and one of the four multiplexers is enabled through one of the four output lines of decoder 31 (EW). The result is that one PROM output bit is selected and output on the Z line to the MUX counter 28 (AW).

The master clock and vertical and horizontal counters described in the text accompanying FIG. 4 supply vertical and horizontal clock pulses to the horizontal counter DZ and CZ and the vertical address counter, EX and EY of FIG. 5. With the appropriate control supplied by control pulse input signals, multiplexers AZ and AY may or may not reverse the vertical and horizontal clock inputs to the vertical and horizontal counters EX, EY, DZ and CZ. The functional result is that the display vertical components are switched.

The page control device implemented from a multiplexer AX allows the PROMs to be reconfigured as a $1K \times 8$ bit memory or $4K \times 2$ bit memory. The latter, in functional terms, allows a longer program, but only two display options instead of eight.

After the page control device selects, for example, a 1K page, and the decoder 3 (EW) selects one multiplexer 27, then the horizontal counter 24 (CZ) supplies the least significant three bit address information to all of the multiplexers, including the selected one. The horizontal counter 22 of FIG. 4 counts from zero to seven, thereby reading out the first 8 bits before the memory is addressed to the next location. In this way an entire 1K by 8 bit memory is read out from the selected PROM.

Exclusive OR circuits BY are supplied to reverse the order in which data is read out of the 64 channels. The exclusive OR outputs are used to control the up/down function of counters AW, AV, 25 (EX, 24 EY), (DZ and CZ), the result being, for example, that filter bank data can be read out from 63 to 0 rather than from 0 to 63. This is controllable through the state of the multiplexer scan reverse control line. Similarly, the memory can be made to scan in the opposite direction through use of the memory scan reverse control lines which controls both vertical and horizontal counters.

The sensor circuit FZ and FY determines the channel number, from 0 to 63, that an initial raster will start with. Devices FZ and FY constitute a flip-flop which drives a counter FT and ET. The speed of this flip-flop is very slow, so that the display change initiated by this circuit is easily controllable by the operator. Upon a system reset, for instance at the top of the display, the count contained in counter FT and ET is parallel loaded into the cursor counter FV and EV. This determines the audio channel number displayed immediately after a reset. This circuit enables the operator to highlight a particular frequency by presetting the system to start at a particular channel number. This count is parallel loaded into counter 28 (AW), AV, through FV, EV. Thereafter, the cursor counter 28 (AW), AV counts through the channels to provide a display for the duration of the raster.

The operation of the counters FT, ET, AW and AV provide a display where a single frequency will appear as a vertical bar of color, the horizontal position of the bar being adjustable as described above. To generate a diagonal bar, additional memory device GX is provided, the output of which is true or false depending on the PROM address lines which also address this device. The additional memory either allows or prevents the vertical clock, through gate FY, from clocking counter FV and EV. The result is that the cursor counter FV and EV is initialized at a channel number and then, for each succeeding raster, may be counted up or down one channel to give a diagonal display. In fact several modes of operation may be selected from the memory GX by the operator producing linear and nonlinear skewed display patterns.

To summarize, the memory counter FT, ET determines the channel number at the start of a raster immediately after a reset, as at the top of the display. The cursor counter FV, EV determines the channel number at the start of every raster thereafter, and the MUX counter 28 (AW), AV determines the channel number for the duration of the raster.

The 1 of 8 decoder 31 (AT) drives the 8 enable lines to the channel multiplexers 12, 13, and 14 of FIG. 2. The least significant 3 bits are supplied in un-decoded form from the MUX counter 28 (AW).

To summarize, filter banks each comprising sixty-four sets of filters as shown in FIG. 1 produce sixty-four sets of three dc signals which are sequentially coupled to the encoder of FIG. 4 which produces a color display therefrom. The multiplexers 12, 13 and 14 required to select one of sixty-four inputs for the encoder are shown in FIG. 2. Finally, the logic required to drive the multiplexers is shown in block diagram form in FIG. 3 and in schematic form in FIG. 5. This logic provides a variety of display formats under operator control.

Alternate systems could be implemented using the basic concepts described above. Three channels of audio could be used as inputs to three indentical filters of the type shown as operational amplifier A1 and surrounding circuit elements of FIG. 1. Three channels of audio are available, for instance, from quadraphonic sound systems.

The above described embodiments of this invention are merely descriptive of its principles and are not to be considered limiting. The scope of this invention instead shall be determined from the scope of the following claims, including their equivalents.

We claim:

1. Apparatus for producing a visual display audio comprising:
   input means for receiving a pair of input audio signals;
   means for generating a third audio signal from said pair of input audio signals;
   means for selecting from each audio signal a narrow band of frequencies;
   means for converting said three selected narrow band signals into signals representative of a colored dot; and
   display means for displaying said dot.

2. The apparatus of claim 1 wherein said means for converting comprises:
   means for producing one primary color signal from each narrow band signal where the intensity of each primary signal is a function of the amplitude of the narrow band signal.

3. The apparatus of claim 2 wherein said display means generates a raster for moving said dot, and wherein the color and intensity of each illuminated color display dot on the raster is determined by the amplitude of the narrow band signal frequencies.

4. Apparatus for producing a visual display from a pair of stereo audio signals comprising:
   a plurality of filter means coupled to a source of stereo audio signals for separating the pair of stereo audio input signals into two sets of narrow band signals;
   means for mixing the two sets of filter outputs to produce a third set of signals;
   means for selecting three signals from said three sets of signals; one signal from each set
   an encoder for converting said three selected signals into a signals representative of a colored display dot; and
   display means for displaying colored dots having intensities which are function of the amplitude of said three selected signals.

5. The apparatus of claim 4 wherein said means for mixing produces a third set of signals which are a function of the difference of instantaneous amplitude of the first two sets of signals.

6. The apparatus of claim 4 wherein said means for mixing produces a third set of signals which are a function of the difference of phase of the first two sets.

7. The apparatus of claim 4 wherein said means for selecting further comprises means for rectifying each selected signal to produce a dc signal proportional to the selected signal amplitude.

8. The apparatus of claim 7 wherein said encoder further comprises means for producing a standard NTSC composite video signal.

9. Apparatus for the visual display of audio comprising;
   input means for receiving a pair of input audio signals;
   means for generating a third signal from said audio input signals on separate channels;
   means for selecting a narrow band of frequencies from each channel;
   means for converting each narrow band signal into a dc signal proportional to the narrow band signal amplitude;
   an encoder to convert the three dc signals into modulation signals for controlling the red, green or blue illumination of a colored dot; and
   display means for generating a raster adapted to display the colored dots wherein the color of illumination and intensity at a location is a function of the dc signal frequency and level in each of said channels.

10. The apparatus of claim 9 wherein said means for generating three channels of audio input comprises the generation of two stereo channels of audio, and a third channel by mixing said two channels.

11. The apparatus of claim 9 wherein the intensity of each colored dot is a function of the input audio amplitude.

12. Apparatus for the visual display of a stereo audio signal comprising:
   two filter banks coupled to said stereo audio signal input for separating the two channels of stereo audio signals into two sets of narrow band signals;
   means for mixing the two sets of narrow band signals to form a third set of signals;
   means for converting the three sets of signals into three sets of dc signals proportional to the original signal amplitude;
   a multiplexer adapted to select one dc signal from each set;
   an encoder for converting the three selected dc signals into a standard television composite video signal;
   a raster scan display means for displaying said composite video; and
   a digital control circuit for controlling said multiplexer to produce a display where the color of each display dot is a function of the frequency of the selected signals and where the intensity of the display is a function of input signal amplitude.

13. The method of converting stereo audio signals into a visual display comprising the steps of:
   separating stereo audio signal channel into two sets of narrow band audio signals;
   mixing said two sets of narrow band signals to form a third set of audio signals;
   selecting three audio signals from said three sets, one signal from each set;
   converting said three selected audio signals into a composite video signal; and
   displaying said composite video signal on a raster scan display device wherein the color of said composite video display is a function of the frequency of said three selected audio signals.

14. The method of claim 13 wherein said step of displaying further comprises the step of varying the display intensity as a function of amplitude of said three selected audio signals.

15. The method of claim 14 wherein said step of converting comprises the steps of:
   rectifying the three audio signals to produce dc signals; and
   encoding the three dc signals to produce a composite video display.

16. The method to converting audio into a visual display comprising the stems of:
   generating three audio signals;
   separating each audio signal into a set of narrow band signals;
   converting each narrow band signal into a dc signal;
   selecting three dc signals one from each set;

converting said three selected dc signals into a composite video signal; and
displaying said composite video signal on a roster scan device.

17. The method of claim 16 wherein said step of displaying results in the display wherein the color of the display at any location of each signal is a function of audio frequency of said three audio signals and the display intensity of each signal as a function of amplitude of said three audio signals.

* * * * *